US012725408B2

(12) United States Patent
Lee et al.

(10) Patent No.: US 12,725,408 B2
(45) Date of Patent: Sep. 1, 2026

(54) METHOD AND APPARATUS WITH DATA LABELING

(71) Applicant: SAMSUNG ELECTRONICS CO., LTD., Suwon-si (KR)

(72) Inventors: Jaewoo Lee, Suwon-si (KR); Yonggonjong Park, Suwon-si (KR); Kapje Sung, Suwon-si (KR); Sujin Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 18/109,928

(22) Filed: Feb. 15, 2023

(65) Prior Publication Data

US 2023/0360381 A1 Nov. 9, 2023

(30) Foreign Application Priority Data

May 4, 2022 (KR) ........................ 10-2022-0055741
Jul. 26, 2022 (KR) ........................ 10-2022-0092683

(51) Int. Cl.

| | |
|---|---|
| ***G06V 10/82*** | (2022.01) |
| ***G01S 19/07*** | (2010.01) |
| ***G06V 10/24*** | (2022.01) |
| ***G06V 10/25*** | (2022.01) |
| ***G06V 10/44*** | (2022.01) |

(52) U.S. Cl.
CPC .............. *G06V 10/82* (2022.01); *G01S 19/07* (2013.01); *G06V 10/242* (2022.01); *G06V 10/25* (2022.01); *G06V 10/44* (2022.01); *G06V 2201/07* (2022.01)

(58) Field of Classification Search
CPC ...... G06V 10/809; G06V 10/82; G06V 10/24; G06V 10/242; G06V 10/245; G06V 10/25; G06V 10/255; G06V 10/44; G06V 10/77; G06V 10/772; G06V 10/774; G06V 10/7753; G06V 2201/07; G06V 10/469; G06V 10/476; G06V 20/58; G06V 20/588; G06V 20/70; G06V 10/751; G01S 19/07;

(Continued)

(56) References Cited

U.S. PATENT DOCUMENTS

2017/0262736 A1* 9/2017 Yu .......................... G06V 10/82
2018/0164812 A1* 6/2018 Oh .......................... G06N 3/02

(Continued)

FOREIGN PATENT DOCUMENTS

KR 10-2021-0044412 A 4/2021
KR 10-2264152 B1 6/2021
KR 10-2022-0033695 A 3/2022

OTHER PUBLICATIONS

Duan, Kaiwen, et al. "Centernet: Keypoint triplets for object detection." *Proceedings of the IEEE/CVF international conference on computer vision.* (2019). pp 6569-6578.

*Primary Examiner* — Oneal R Mistry
*Assistant Examiner* — Duy Tran
(74) *Attorney, Agent, or Firm* — NSIP Law

(57) ABSTRACT

An apparatus and method with data labeling are provided. An apparatus includes one or more processors configured to obtain localization information related to an object, based on the localization information, extract a landmark point from a landmark map including coordinates of a landmark, generate a ground truth image based on the extracted landmark point, and generate training data by refining the ground truth image.

18 Claims, 7 Drawing Sheets

(58) Field of Classification Search
CPC ...... G01S 17/88; G01S 17/89; G01S 13/9021; G01S 13/9027
See application file for complete search history.

(56) References Cited

U.S. PATENT DOCUMENTS

| | | | | |
|---|---|---|---|---|
| 2019/0137280 | A1* | 5/2019 | Ghadiok | G01C 21/005 |
| 2020/0098135 | A1* | 3/2020 | Ganjineh | G01C 21/3848 |
| 2020/0324795 | A1* | 10/2020 | Bojarski | G05D 1/0274 |
| 2020/0372285 | A1* | 11/2020 | Adams | G06V 20/582 |
| 2021/0001891 | A1* | 1/2021 | Majithia | B60W 50/06 |
| 2021/0118185 | A1* | 4/2021 | Sarukkai | G06N 3/09 |
| 2021/0166052 | A1* | 6/2021 | Park | G06F 18/214 |
| 2021/0347378 | A1 | 11/2021 | Nabatchian et al. | |

* cited by examiner

400

| No. | Longitude and latitude | | Coordinates | | Remarks |
|---|---|---|---|---|---|
| | Longitude | Latitude | X(N) | Y(E) | |
| 0 | 127.05458467 | 37.25450182 | 417267.83052 | 204841.85202 | |
| 1 | 127.05457117 | 37.25448449 | 417265.90671 | 204840.65563 | |
| 2 | 127.05455713 | 37.25446686 | 471263.94958 | 204839.41136 | |
| 3 | 127.05454321 | 37.25444940 | 417262.01132 | 204838.17773 | |
| 4 | 127.05452933 | 37.25443195 | 417260.07417 | 204836.94764 | |
| 5 | 127.05451534 | 37.25441440 | 417258.12592 | 204835.70779 | |
| 6 | 127.05450134 | 37.25439688 | 417256.18101 | 204834.46706 | |
| 7 | 127.05448737 | 37.25437936 | 417254.23609 | 204833.22899 | |
| 8 | 127.05447345 | 37.25436181 | 417252.28784 | 204831.99536 | |
| 9 | 127.05445966 | 37.25434426 | 417250.33961 | 204830.77326 | |
| 10 | 127.05444568 | 37.25432673 | 417248.39358 | 204829.53430 | |

FIG. 4

METHOD AND APPARATUS WITH DATA LABELING

CROSS-REFERENCE TO RELATED APPLICATIONS

This application claims the benefit under 35 USC § 119(a) of Korean Patent Application No. 10-2022-0055741, filed on May 4, 2022, and Korean Patent Application No. 10-2022-0092683, filed on Jul. 26, 2022, in the Korean Intellectual Property Office, the entire disclosure of which is incorporated herein by reference for all purposes.

BACKGROUND

1. Field

The following description relates to an apparatus and method with data labeling.

2. Description of Related Art

To develop an autonomous driving algorithm, it is helpful to secure training data in advance to train a neural network of an autonomous driving system. The training data of a general vision-based neural network may include input images and task-specific ground truth (GT) information.

Conventionally, significant time, effort, or cost is expended to obtain training data by performing manual labeling on data. For example, for an autonomous parking function, a neural network may be used that finds both edges of an empty (or available) parking space using a top-view. In the conventional method, a person searches training images for coordinates of points that meet a condition.

A large number of data items (e.g., thousands or tens of thousands of images) may be required to sufficiently train a network through deep learning techniques. In order to obtain such large-scale data, significant manpower and effort are required, and the cost of educating people to consistently acquire and prepare GT data is required. When an outsourced service is used to acquire such training data, there may be a very high cost.

In addition, for commercial-grade algorithms, it is beneficial to develop a neural network that is robust to various time zones, weather, and environments, when there is an environment in which the developed neural network does not work well, additional data for such an environment might need be acquired, so, the cost for additional acquisition is constantly required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus includes one or more processors configured to obtain localization information related to an object, based on the localization information, extract a landmark point from a landmark map including coordinates of a landmark, generate a ground truth image based on the extracted landmark point, and generate training data by refining the ground truth image.

The landmark map may include geographic coordinate system coordinates or projected coordinate system coordinates of the landmark obtained based on a differential global positioning system (DGPS).

The one or more processors may be further may be configured to determine a region of interest (ROI) based an image of surroundings of the object, and extract points in the ROI as the landmark point.

The processor may be further configured to obtain transformed landmark coordinates by transforming the landmark point using a local coordinate system of the object, and generate the ground truth image by projecting the transformed landmark coordinates into an image domain.

The one or more processors may be further configured to transform the transformed landmark coordinates to a reference coordinate system of a camera that captures surroundings of the object based on direction information of the object, and generate the ground truth image by projecting the reference coordinate system into the image domain based on a model and/or intrinsic parameter of the camera.

The one or more processors may be further configured to transform the transformed landmark coordinates to the reference coordinate system based on orientation of the object and a rotation difference between the object and the camera.

The processor may be further configured to obtain pixel coordinates of the landmark point based on the ground truth image.

The processor may be further configured to extract a local patch image from the ground truth image, and generate the training data by searching for a target landmark point in the local patch image.

The processor may be further configured to generate the training data by generating a map based on global coordinates of the target landmark point.

In another general aspect, an apparatus includes one or more processers, memory storing instructions configured to, when executed by the one or more processors, cause the one or more processors to obtain localization information related to an object, extract a landmark point around the object based on the landmark map, generate a ground truth image based on the landmark point, generate training data by refining the ground truth image, and train a neural network based on the training data.

In another general aspect, a method of generating training data includes obtaining localization information related to an object, extracting a landmark point around the object based on a landmark map, the landmark map further includes coordinates of a landmark, generating a ground truth image based on the landmark point, and generating training data by refining the ground truth image.

The landmark map may include geographic coordinate system coordinates or projected coordinate system coordinates of the landmark.

The extracting of the landmark point may include determining an ROI based on an image of surroundings of the object, and extracting a point in the ROI as the landmark point.

The generating of the ground truth image may include obtaining transformed landmark coordinates by transforming the landmark point to a local coordinate system of the object, and generating the ground truth image by projecting the transformed landmark coordinates into an image domain.

The generating of the ground truth image by projecting the transformed landmark coordinates into an image domain may include transforming the transformed landmark coordinates to a reference coordinate system of a camera that captures images of surroundings of the object based on direction information of the object, and generating the ground truth image by projecting the reference coordinate system into the image domain based on a model and/or intrinsic parameter of the camera.

The transforming of the transformed landmark coordinates to the reference coordinate system may include transforming the transformed landmark coordinates to the reference coordinate system based on a direction in which the object may be facing and orientation information of the object relative to the camera.

The generating of the ground truth image may include obtaining pixel coordinates of the landmark point based on the ground truth image.

The generating of training data by refining the ground truth image may include generating the training data by searching for a target landmark point in a local patch image of the ground truth image.

The generating of the training data by searching for a target landmark point in the local patch image may include generating the training data by generating a map based on global coordinates of the target landmark point.

The localization information may include geographic coordinates of the object.

Other features and aspects will be apparent from the following detailed description, the drawings, and the claims.

BRIEF DESCRIPTION OF THE DRAWINGS

FIG. 4 illustrates an example map database including coordinates of landmark points, according to one or more embodiments.

Figure 1A:
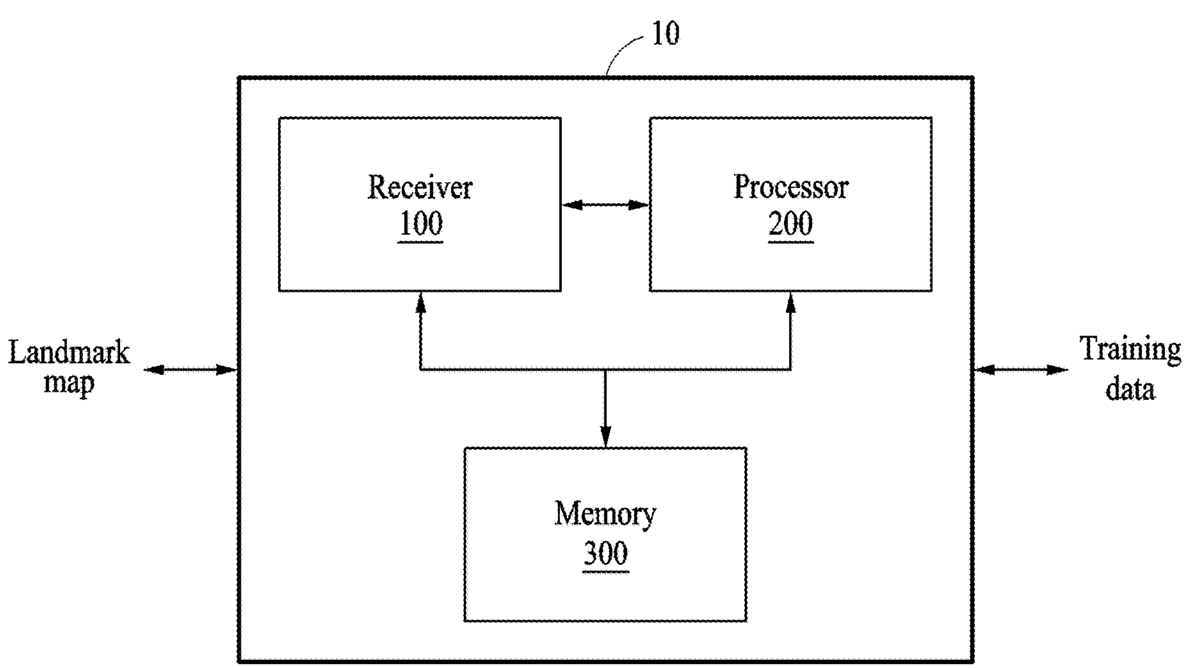
FIG. 1A illustrates an example computing apparatus, according to one or more embodiments.

Throughout the drawings and the detailed description, unless otherwise described or provided, the same or like drawing reference numerals refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Figure 1B:
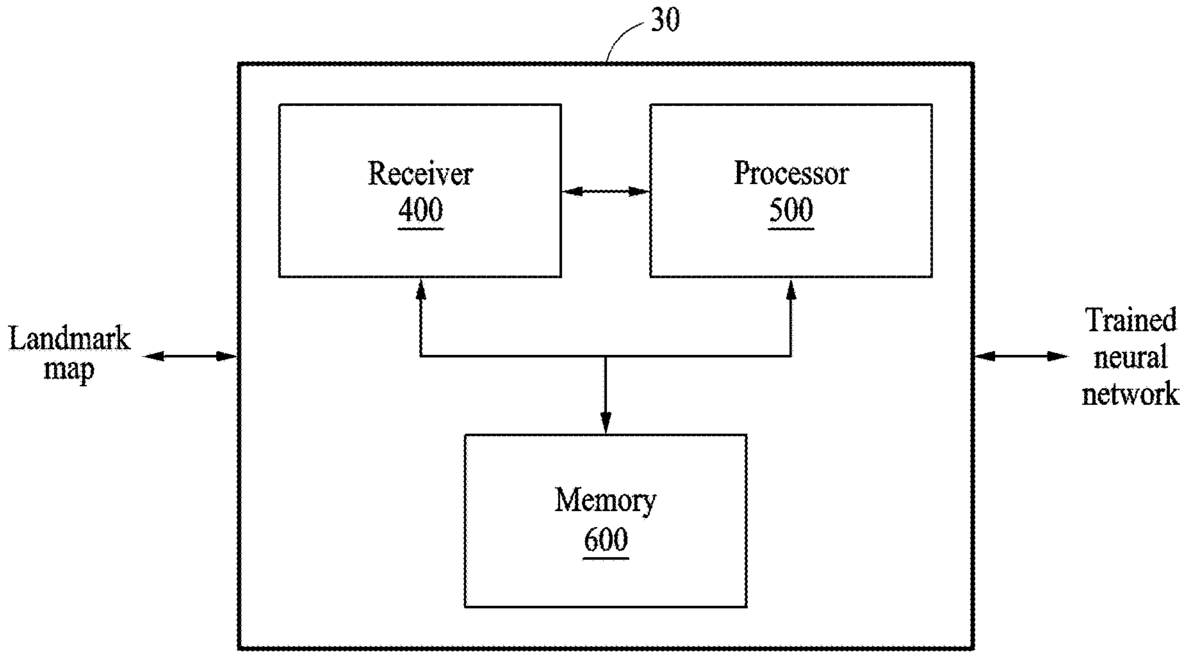
FIG. 1B illustrates an example training apparatus, according to one or more embodiments.

FIG. 1A illustrates an example computing apparatus, according one or more embodiment, and FIG. 1B illustrates an example training apparatus, according to one or more embodiments.

Referring to FIGS. 1A and 1B, a computing apparatus 10 may generate training data for training a neural network. A training apparatus 30 may generate training data and may also train the neural network using the generated training data.

The neural network may generally be a model having a problem-solving ability implemented through nodes (i.e., neurons) forming a network through connections where strengths of the connections are changed through learning.

A neuron/node of the neural network may include a combination of weights and/or biases. The neural network may include one or more layers, each including one or more neurons or nodes. The neural network may infer a result from a predetermined input by changing the weights of the neurons through training.

The neural network may include a deep neural network (DNN). More specifically, the neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and/or an attention network (AN).

The computing apparatus 10 and training apparatus 30 may be implemented in a personal computer (PC), a data server, a mobile device, or the like.

A portable device may be, for example, a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, a smart device, and the like. The smart device may be, for example, a smart watch, a smart band, and a smart ring.

The training apparatus 30 may train a neural network on the training apparatus 30. For example, the training apparatus 30 may be implemented inside an object such as a vehicle, a robot, a drone, a vessel, etc. to perform training. The training apparatus 30 may train a neural network thereon for autonomous control of the object, e.g., driving, parking etc.

The computing apparatus 10 and/or the training apparatus 30 may automatically generate training data for training a neural network. The computing apparatus 10 and/or the training apparatus 30 may be mounted on any of various products/objects that use a neural network so as to perform training in the form of federated learning to improve the performance of the neural network.

The computing apparatus 10 and/or the training apparatus 30 may automatically label training data, for example, by labeling landmarks.

The computing apparatus 10 and/or the training apparatus 30 may perform landmark localization. The computing apparatus 10 and/or training apparatus 30 may generate training data for training a landmark detection and segmentation neural network for the landmark localization.

The computing apparatus 10 may include a receiver 100 and a processor 200. The computing apparatus 10 may further include a memory 300. The training apparatus 30 may include a receiver 400 and a processor 500. The training apparatus 30 may further include a memory 600.

The receiver 100 and/or the receiver 400 may receive location information for image processing (e.g., a location of an object). For example, the receiver 100 and/or the receiver 400 may receive location information through a global positioning system (GPS) or a differential global positioning system (DGPS).

The receiver 100 and/or the receiver 400 may receive a landmark map. The receiver 100 and/or the receiver 400 may include a receive interface. The receiver 100 and/or the receiver 400 may output the received landmark map to the processor 200 or the processor 500. In some implementations, the landmark map may be based on the location information.

The landmark map may be, for example, a map including landmark information, e.g., coordinates for landmarks that may be used for image processing, as will be described.

The landmark map may include geographic coordinate system coordinates (or projected coordinate system coordinates) of landmarks obtained based on DGPS. For example, a geographic coordinate system may include latitude and longitude. The geographic coordinate system may be a projected coordinate system, for example Transverse Mercator (TM) coordinates.

The landmark information may include coordinates corresponding to an arbitrary point at which an object is to be controlled (e.g., autonomously). The object may be mobile and may include any electronic device that may control movement of the object. For example, the object may be a vehicle, a ship, an air vehicle, a robot, a drone, a vessel, and so forth.

The processor 200 and the processor 500 may process data stored in the memory 300 and the memory 600. The processor 200 and the processor 500 may execute computer-readable code (e.g., instructions, applications, etc.) stored in the memory 300 and/or the memory 600 and instructions triggered/generated by the processor 200 and/or the processor 500.

The processor 200 and/or the processor 500 may be a data processing device implemented by hardware having a circuit having a physical structure configured to execute desired operations. For example, the desired operations may include code or instructions included in a stored program.

For example, the hardware-implemented data processing device may include a microprocessor, a central processing unit (CPU), a processor core, a multi-core processor, a multiprocessor, an application-specific integrated circuit (ASIC), a neuroprocessor, a graphics processing unit (GPU) and/or a field-programmable gate array (FPGA), for example.

The processor 200 and/or the processor 500 may obtain localization information related to an object to be controlled. The localization information may include latitude and longitude of the object and/or a direction in which the object is facing (e.g., a heading of the object).

The processor 200 and/or the processor 500 may obtain localization information using DGPS or may estimate localization information using a localization algorithm.

The processor 200 and/or the processor 500 may extract a landmark point around the object based on the landmark map. The landmark point may be any point included in images, for example, a vertex.

The processor 200 and/or the processor 500 may determine a region of interest (ROI) based on a peripheral image of the object (i.e., an image of the periphery of the object). The processor 200 and/or the processor 500 may extract points included in the ROI as landmark points.

The processor 200 and/or the processor 500 may generate a ground truth image based on the landmark point. The processor 200 and/or the processor 500 may obtain transformed landmark coordinates by transforming the landmark point using a local coordinate system based on the object. The processor 200 and/or the processor 500 may generate a ground truth image by projecting the transformed landmark coordinates into an image domain.

The processor 200 and/or the processor 500 may transform the transformed landmark coordinates to a reference coordinate system of a camera (that captures surroundings of the object) based on direction information of the object. The processor 200 and/or the processor 500 may transform the transformed landmark coordinates to a reference coordinate system based on a direction in which the object is facing and rotation (orientation) information of the object relative to the camera.

The processor 200 and/or the processor 500 may generate a ground truth image by projecting points in a reference coordinate system into an image domain based on a model and an intrinsic parameter of a camera. The intrinsic parameter may include a focal length, a principal point, a skew coefficient and/or lens distortion parameter, and so forth, any of which may bear on how to project reference coordinates to an image domain.

The processor 200 and/or the processor 500 may obtain pixel coordinates of landmark points based on the ground truth image. The pixel coordinates may refer to coordinates of pixels including the ground truth image or training data.

The processor 200 and/or the processor 500 may generate training data by refining the ground truth image. The processor 200 and/or the processor 500 may extract a local patch image of a predetermined size from the ground truth image. The processor 200 and/or the processor 500 may generate training data by searching for a target landmark point in a local patch image.

The processor 200 and/or the processor 500 may generate training data by generating a map based on global coordinates of the target landmark point. The training data may be composed of a ground truth image including global coordinates of landmark points in the ground truth image.

The processor 500 may train a neural network based on training data, for example generated as described above.

The memory 300 and/or the memory 600 may store data for an operation or an operation result. The memory 300 and/or the memory 600 may executable instructions (or code/programs) executable by the processor 200. For example, the instructions may include instructions to perform an operation of the processor and/or an operation of each element of the processor.

The memory 300 and/or the memory 600 may be implemented as a volatile memory device or a non-volatile memory device. A volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM). A non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, a molecular electronic memory device, or insulator resistance change memory.

Figure 2:
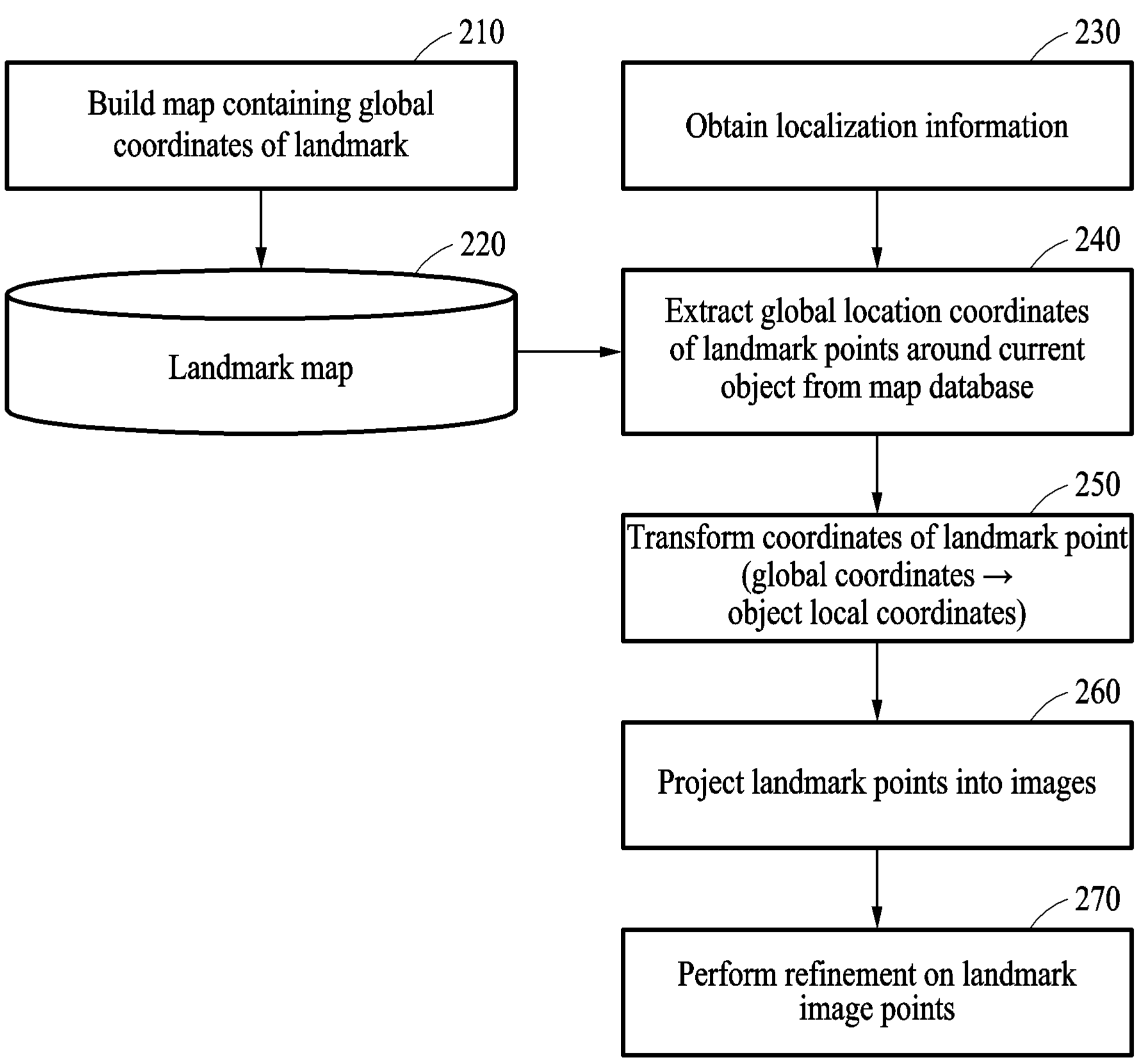
FIG. 2 illustrates an example method with training data generation, according to one or more embodiments.
Figure 3:
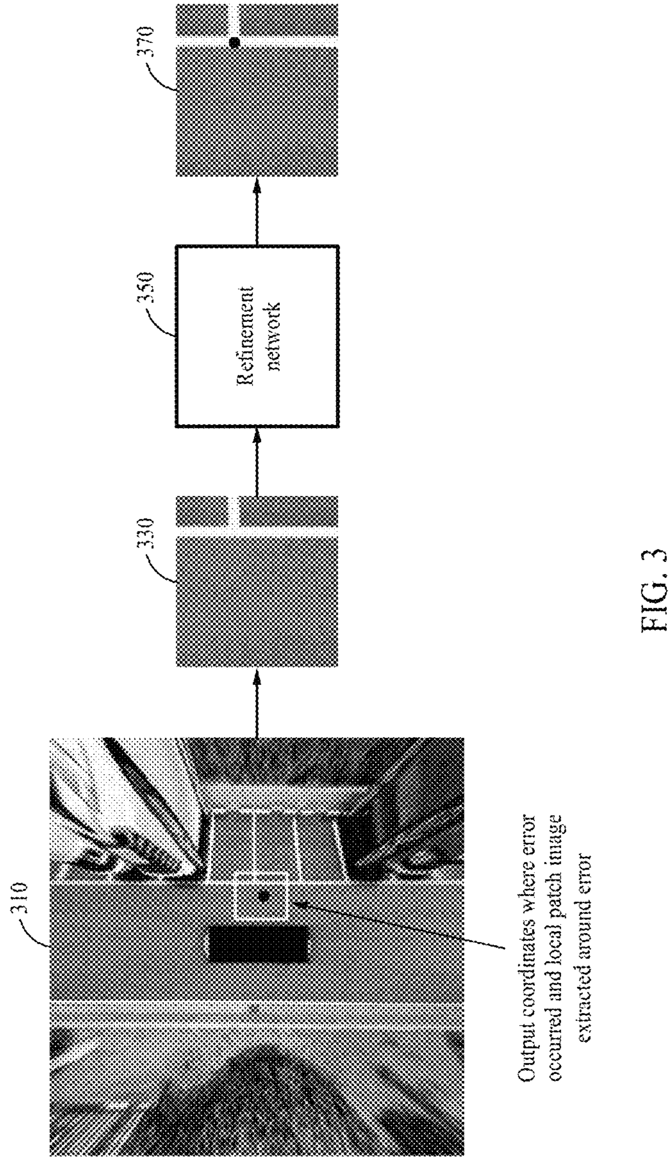
FIG. 3 illustrates an example refining operation, according to one or more embodiments.

FIG. 2 illustrates a method with training data generating, and FIG. 3 illustrates an example of a refining operation, according to one or more embodiments.

Referring to FIGS. 2 and 3, in operation 210, a processor (e.g., the processor 200 and/or the processor 500 of FIG. 1) may build a map containing global coordinates of the landmark, e.g., a landmark map 220. Alternatively, the processor 200 and/or the processor 500 may receive the landmark map 220 from an external resource, for example, by requesting the map from a cloud service.

In operation 230, the processor 200 and/or the processor 500 may obtain localization information. The localization information may include latitude and longitude of the object and/or a direction in which the object is facing (e.g., a heading of the object), although any locational frame of reference (and position/coordinates therein) may be used.

The processor 200 and/or the processor 500 may obtain localization information using DGPS or may estimate localization information using a localization algorithm.

In implementations or conditions when the processor 200 and/or the processor 500 does not use the DGSP, other types of sensors and a localization algorithm suitable for the sensors may estimate localization information. The sensor may be a camera and/or light detection and ranging (Lidar). For example, a Lidar sensor may estimate a location of the target landmark by using a localization algorithm used by Lidar simultaneous localization and mapping (SLAM).

In operation 240, the processor 200 and/or the processor 500 may extract global location coordinates of landmark points around the object from a map database (e.g., the landmark map 220). The processor 200 and/or the processor 500 may extract location information of landmark points in surroundings of the object based on the landmark map.

For example, the processor 200 and/or the processor 500 may extract location information of landmark points using a birds-eye view image such as the birds-eye view image 310 of FIG. 3.

The processor 200 and/or the processor 500 may determine a ROI by determining the horizontal and vertical lengths of a region to be imaged with respect to the object using the bird-eye view image 310. The processor 200 and/or the processor 500 may extract location information only for landmark points that are seen (or visible) within the ROI; in some implementations, the ROI may be predetermined.

In operation 250, the processor 200 and/or the processor 500 may transform the coordinates of the landmark point from global coordinates to local coordinates of a locale or frame of reference of the object. For example, the local coordinates may have an arbitrary point as an origin point (e.g., the center of the object), a moving direction of the object as an x-axis, and a left side of the object as a y-axis with respect to the moving direction.

The processor 200 and/or the processor 500 may calibrate rotation and/or translation information between the camera (e.g., installed on the object) and the coordinate system of the object, and store the calibrated rotation/translation information in memory (e.g., the memory 300 and/or the memory 600 of FIG. 1).

The processor 200 and/or the processor 500 may transform the local coordinate system of the object to the reference coordinate system of the camera based on rotation and/or transformation information between the local coordinate system of the object and the reference coordinate of the camera. For example, rotation/transformation information may correspond to a difference in orientation of the camera and the object. For example, the rotation/transformation information may be a rotation/translation mapping between the local coordinate system and the reference coordinate system of the camera.

The processor 200 and/or the processor 500 may transform the transformed landmark coordinates to a reference coordinate system of a camera that captures surroundings of the object, and, in some implementations, may do so based on direction information of the object (e.g., a heading thereof), and/or rotation information corresponding to a difference between the object and the camera.

In operation 260, to generate a ground truth image, the processor 200 and/or the processor 500 may project the landmark points onto one or more images based on the reference coordinates of a camera. The processor 200 and/or the processor 500 may transform the landmark coordinates expressed in the local coordinate system of the object to the reference coordinate system of the camera using the calibration information described above, and then may project the coordinates transformed to the reference coordinate system into an image domain based on a model and/or internal parameter of the camera. Through this, the processor 200 and/or the processor 500 may obtain pixel coordinates of landmark points in the ground truth image of data to be used for training.

In operation 270, the processor 200 and/or the processor 500 may perform refinement on the projected landmark image points. The processor 200 and/or the processor 500 may correct an error on a landmark point of the training data by performing refinement on the landmark image points included in the ground truth image. Due to possible error in the generated ground truth image, a landmark point (e.g., a corner) may not be at an exact location (at a location that corresponds to the actual location of the corresponding landmark in the ground truth image). Rather, a landmark point may be specified to a location at an arbitrary point where the error occurs relative to the actual landmark point.

Since a ground truth image including such an error affects the training performance of a neural network (and the resulting inference performance of the neural network), the processor 200 and/or the processor 500 may improve the training performance of the neural network by performing refinement.

The processor 200 and/or the processor 500 may perform the refinement to the landmark point by using a feature detection algorithm and/or by accurately searching for the landmark point using a separate neural network.

The processor 500 may extract a local patch image 330 of a predetermined size from the ground truth image ("predetermined" meaning that the size is determined any time up to when it is used). The processor 200 and/or the processor 500 may generate a refined patch 370 by searching for the target landmark point in the local patch image 330.

In the example of FIG. 3, the processor 200 and/or the processor 500 may extract a local patch image with respect to the landmark point obtained from the ground truth image. The processor 200 and/or the processor 500 may search for a target landmark point in the local patch image extracted using the refinement network 350 (an example image patch is shown as a square and a dot therein).

The processor 200 and/or the processor 500 may obtain/generate training data including a refined ground truth image that is robust over varying time zones, weather, or environments by building a map including global coordinates of the target landmark point.

FIG. 4 illustrates an example of a map database 400 including coordinates of a landmark point, according to one or more embodiments.

Referring to FIG. 4, the processor (e.g., the processor 200 and/or the processor 500) may automatically perform labeling of the training data, for example, of landmarks in ground truth image, which may obviate the need for manual labeling of the training data.

Although FIGS. 2 and 3 show an example case of searching for the landmark point which is a vertex of a parking space for autonomous parking, the processor 200 and/or the processor 500 may also perform other tasks specifying coordinates of an object, for example, in a static state.

The processor 200 and/or the processor 500 may generate a map and automatically perform labelling of landmarks. The processor 200 and/or the processor 500 may generate a map including global coordinates of landmark points. Note that "global" only implies that the global coordinates are in a different frame of reference (e.g., different coordinate system) than local coordinates.

When the task is autonomous parking, for example, the processor 200 and/or the processor 500 may obtain global coordinates of vertices of parking spaces. For example, the processor 200 and/or the processor 500 may obtain geographic coordinate system coordinates or projected coordinate system coordinates of landmark points using DGPS. For example, a geographic location of the object may be thus determined. The processor 200 and/or the processor 500 may obtain global coordinates of landmark points using an open map application programming interface (API) (e.g., OpenStreetMap), for example, and may obtain same based on the geographic location of the object.

The processor 200 and/or the processor 500 may store obtained global coordinates in the memory (e.g., the memory 300 and/or the memory 600 of FIG. 1), for example, in the form of a look-up table (LUT). FIG. 4 shows an example of coordinates stored in the form of a LUT.

Figure 5:
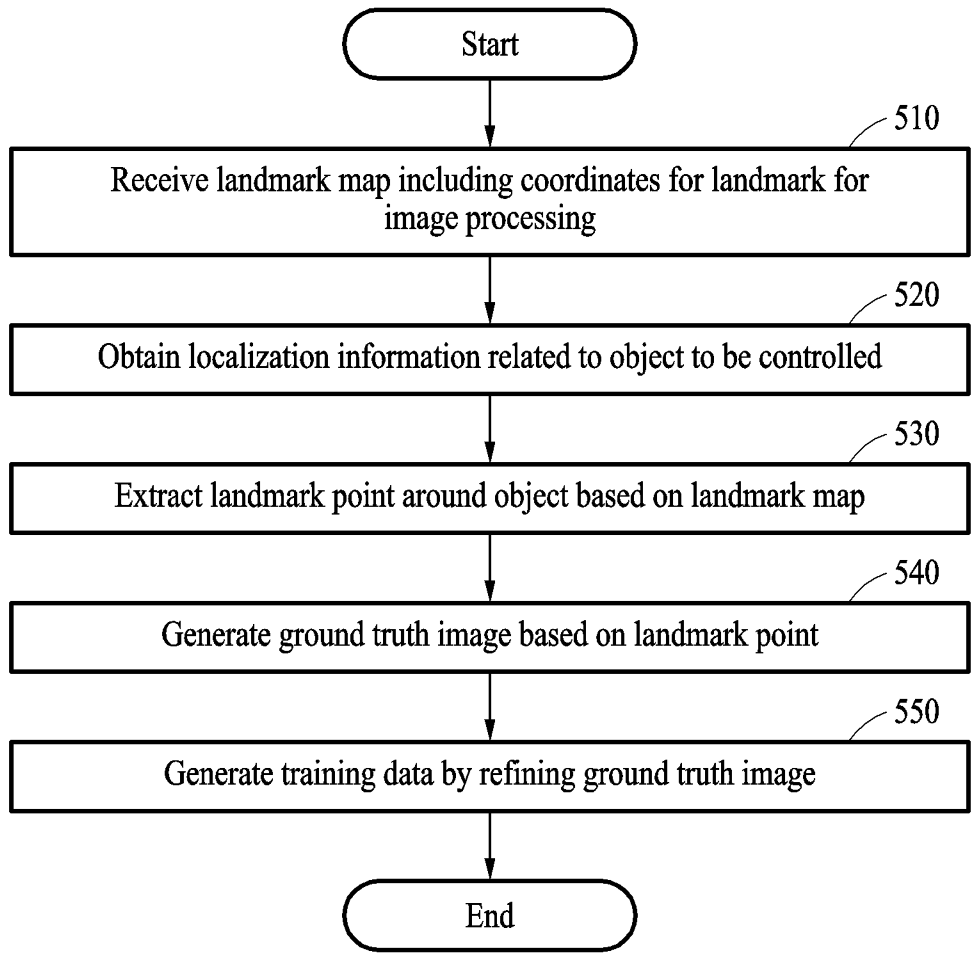
FIG. 5 illustrates an example method with training data generation, according to one or more embodiments.

FIG. 5 illustrates an example method with training data generation, according to one or more embodiments.

Referring to FIG. 5, in operation 510, a receiver (e.g., the receiver 100 of FIG. 1) may receive a landmark map including coordinates of a landmark for image processing. For example, the receiver may be a network interface and the landmark map may be received via a network. In other examples, the receiver may be an internal software interface, a bus, or the like, that receives the landmark map.

In operation 520, the processor (e.g., the processor 200 of FIG. 1) may obtain localization information related to an object, for example an object to be controlled. The localization information may include latitude and longitude of the object and/or a direction in which the object is facing (e.g., a heading of the object).

In operation 530, the processor 200 may extract a landmark point around (proximate to) the object from the landmark map based on the localization information of the object.

The processor 200 may determine an ROI based on a peripheral image of an object (i.e., an image of the periphery or surroundings of the object). The processor 200 may extract points included in the ROI as landmark points.

In operation 540, the processor 200 may generate a ground truth image based on the extracted landmark points. The processor 200 may obtain transformed landmark coordinates by transforming the extracted landmark points to a local coordinate system based on (or anchored to) the object. The processor 200 may generate a ground truth image by projecting the transformed landmark coordinates into the image domain.

The processor 200 may transform the transformed landmark coordinates to a reference coordinate system of a camera that captures images of surroundings of the object, which, in some implementations, may be based on direction information of the object (e.g., images may be captured in a direction of object movement). The processor 200 may transform the transformed landmark coordinates to the reference coordinate system based on a direction in which the object is facing and/or rotation (orientation) information between the object and the camera. That is, one or more transforms may be applied to map the transformed landmark coordinates to the camera's frame of reference.

The processor 200 may generate a ground truth image by projecting the landmark points (as transformed to the reference coordinate system) into the image domain based on a model and internal parameter of a camera.

The processor 200 may obtain pixel coordinates of the landmark points based on the ground truth image.

In operation 550, the processor 200 may generate training data by refining the ground truth image (e.g., refining a location of a landmark point in the ground truth image). The processor 200 may extract a local patch image of a predetermined size from the ground truth image. The processor 200 may generate training data by searching for a target landmark point in the local patch image.

The processor 200 may generate training data by generating a map based on the global coordinates of the target landmark point.

Figure 6:
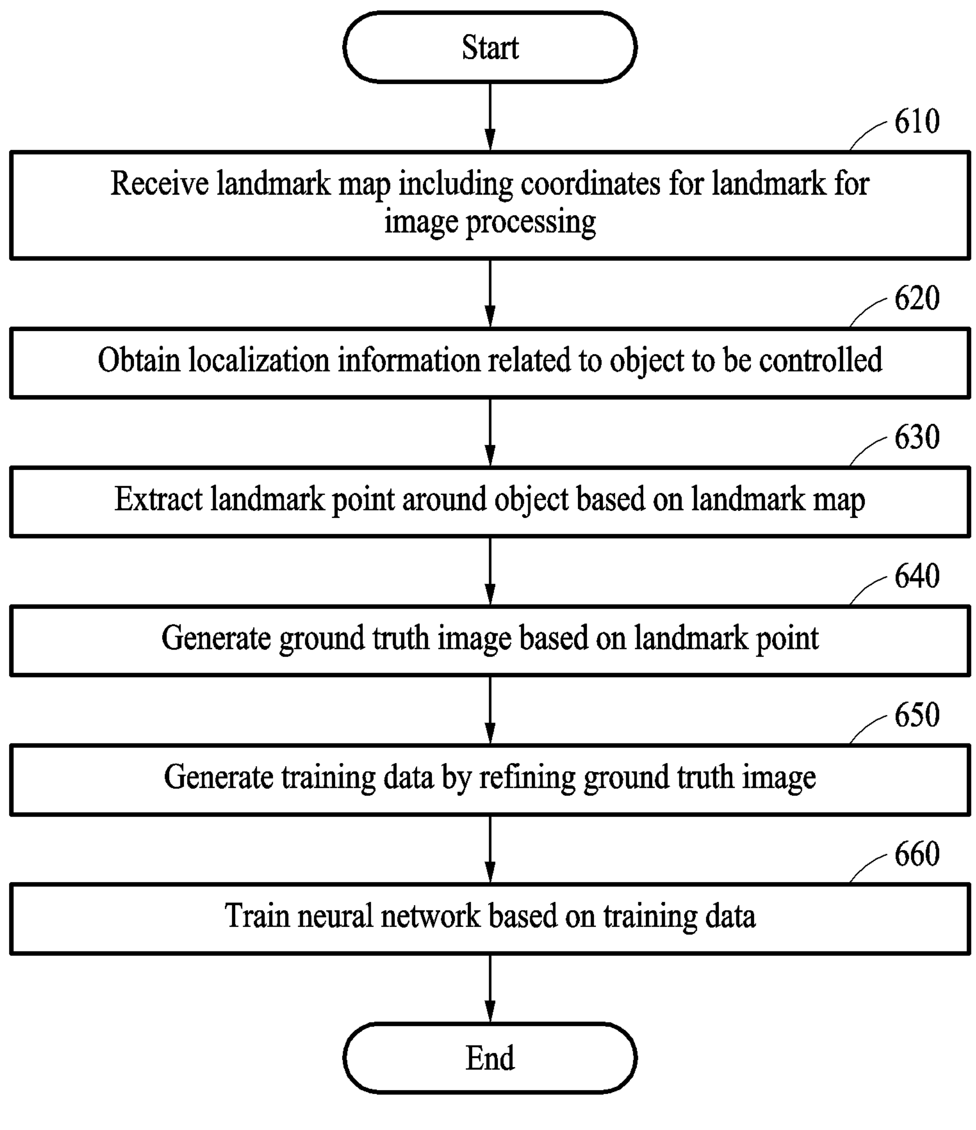
FIG. 6 illustrates an example training method, according to one or more embodiments.

FIG. 6 illustrates an example of an operation of a training method, according to one or more embodiments.

Referring to FIG. 6, in operation 610, a receiver (e.g., the receiver 400 of FIG. 1) may receive a landmark map including coordinates for a landmark for image processing.

In operation 620, the processor (e.g., the processor 500 of FIG. 1) may obtain localization information related to an object to be controlled, for example (resulting training data has many applications). The localization information may include latitude and longitude of the object and/or a direction in which the object is facing (e.g., a heading of the object).

In operation 630, the processor 500 may extract from the landmark map a landmark point around/near the object based on the localization information of the object.

The processor 500 may determine an ROI based on a peripheral image of the object (i.e., an image of the periphery of the object). The processor 500 may extract points included in the ROI as landmark points.

In operation 640, the processor 200 may generate a ground truth image based on the extracted landmark points. The processor 500 may obtain transformed landmark coordinates by transforming (remapping) the extracted landmark points to a local coordinate system that is based on the object, e.g., a coordinate system that is local to or centered on the object. The processor 500 may generate a ground truth image by projecting the transformed landmark coordinates into the image domain.

The processor 500 may transform the transformed landmark coordinates to a reference coordinate system of a camera that captures images of surroundings of the object based on, for example, direction information of the object. The processor 500 may transform the transformed landmark coordinates to the reference coordinate system based on a direction in which the object is facing and rotation information between the object and the camera (e.g., a rotation/orientation difference between the object and the camera).

The processor 500 may generate a ground truth image by projecting the landmark coordinates in the reference coordinate system into the image domain based a model and/or internal parameter of a camera.

The processor 500 may obtain pixel coordinates of the landmark points based on the ground truth image.

In operation 650, the processor 500 may generate training data by refining the ground truth image. The processor 200 may extract a local patch image of a predetermined size from the ground truth image. The processor 500 may generate training data by searching for a target landmark point in the local patch image.

The processor 500 may generate training data by generating a map based on global coordinates of the target landmark point as refined by searching in the local patch image.

In operation 660, the processor 500 may train a neural network based on the training data.

Figure 7:
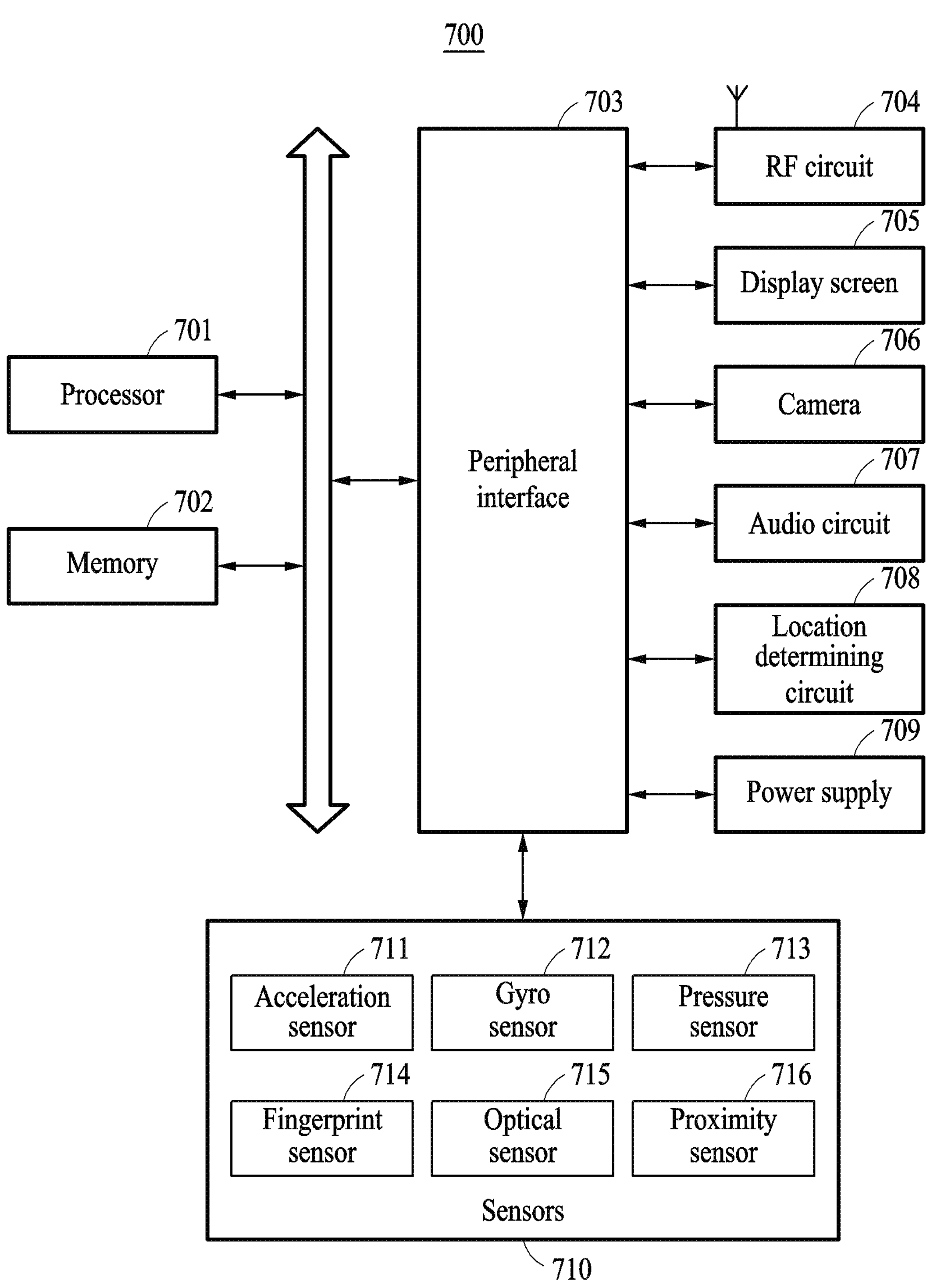
FIG. 7 illustrates an example electronic device, according to one or more embodiments.

FIG. 7 illustrates an example electronic device 700, according to one or more embodiments. The electronic device 700 is an example of any of the devices described above, including an object. The electronic device may include a processor 701, a memory 702, a peripheral interface 703, a radio frequency (RF) circuit 704, a display screen 705, a camera 706, and audio circuit 707, a location determining circuit 708, a power supply 709. The electronic device 700 may also include sensors 710, for example an acceleration sensor 711, a gyro sensor 712, a pressure sensor 713, a fingerprint sensor 714, an optical sensor 715, and or a proximity sensor 706. The processor 701 may be one or more of any of the types of processors described herein. The memory 702 may be any combination of the storage devices described herein (and does not include a signal per se). The components of the electronic device 700 may communicate with each other in known ways.

The computing apparatuses, the vehicles, the electronic devices, the processors, the memories, the image sensors, the vehicle/operation function hardware, the ADAS/AD (advanced driver assist/autonomous driving) systems, the displays, the information output system and hardware, the storage devices, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An apparatus in a moving object comprising:

one or more processors configured to:

obtain access to a landmark database comprising landmark points that are geographic coordinates of respective landmarks in a geographic coordinate system;

after obtaining access to the landmark database, obtain localization information of the moving object, the localization information comprising a geographic location of and/or a direction from the moving object;

based on the localization information, extract landmark points corresponding to a vicinity of the moving object from the landmark database;

determine a region of interest (ROI) by determining a horizontal and vertical lengths of an area around the moving object using a bird-eye view image;

identify one or more visible landmark points located within the determined ROI among the extracted landmark points;

transform the geographic coordinates of the identified one or more visible landmark points local coordinates into local coordinates in a local coordinate system of the moving object or a camera thereof;

generate a ground truth image by projecting the local coordinates of the landmark points into an image domain; and generate training data by refining the generated ground truth image, the refining comprising searching the ground truth image for target landmark points corresponding to the identified one or more landmark points.

2. The apparatus of claim 1, wherein the geographic coordinates comprise geographic coordinate system coordinates or projected coordinate system coordinates of the landmarks obtained based on a differential global positioning system (DGPS).

3. The apparatus of claim 1, wherein the one or more processors are further configured to:

determine a region of interest (ROI) based on a birds-eye-view image of surroundings of the moving object; and extract the landmark points from the landmark database based on the ROI.

4. The apparatus of claim 1, wherein the local coordinate system is of the camera, wherein the camera captures surroundings of the moving object based on the direction from the moving object and wherein the projecting into the image domain is based on a model and/or intrinsic parameter of the camera.

5. The apparatus of claim 4, wherein the one or more processors are further configured to transform the geographic coordinates of the identified one or more landmark points into local coordinates in a reference coordinate system of the moving object based on orientation of the moving object and a rotation difference between the moving object and the camera, wherein the direction of the moving object is the direction from the moving object or is a heading of the moving object.

6. The apparatus of claim 1, wherein the searching the ground truth image for target landmark points corresponding to the identified one or more landmark points obtains pixel coordinates of the landmark points based on the ground truth image.

7. The apparatus of claim 1, wherein the one or more processors are further configured to:

extract a local patch image from the ground truth image; and generate the training data by searching for the target landmark points in the local patch image.

8. The apparatus of claim 7, wherein the one or more processors are further configured to generate the training data by generating a map based on global coordinates of the target landmark point.

9. An apparatus comprising:

one or more processors;

memory storing instructions configured to, when executed by the one or more processors, cause the one or more processors to:

obtain access to a landmark database comprising landmark points that are geographic coordinates of respective landmarks in a geographic coordinate system;

after obtaining access to the landmark database, obtain localization information of the moving object, the localization information comprising a geographic location of and/or a direction from the moving object;

according to the localization information, extract landmark points corresponding to a vicinity of the moving object from the landmark database;

determine a region of interest (ROI) by determining a horizontal and vertical lengths of an area around the moving object using a bird-eye view image;

identify one or more visible landmark points located within the determined ROI among the extracted landmark points;

transform the geographic coordinates of the identified one or more landmark points local coordinates into local coordinates in a local coordinate system of the moving object or a camera thereof;

generate a ground truth image by projecting the local coordinates of the landmark points into an image domain;

generate training data by refining the generated ground truth image, the refining comprising searching the ground truth image for target landmark points corresponding to the identified one or more landmark points; and train a neural network based on the training data.

10. The method of claim 9, wherein the local coordinate system is of the camera, wherein the camera captures images of surroundings of the moving object based on the direction from the moving object, and wherein the projecting into the image domain is based on a model and/or intrinsic parameter of the camera.

11. The method of claim 10, wherein the geographic coordinates of the identified one or more landmark points are transformed into local in a reference coordinate system based on a direction in which the moving object is facing and orientation information of the moving object relative to the camera.

12. A method of generating training data performed for a moving object, the method comprising:

obtaining access to a landmark database comprising landmark points that are geographic coordinates of respective landmarks in a geographic coordinate system;

after obtaining access to the landmark database, obtain localization information of the moving object, the localization information comprising a geographic location of and/or a direction from the object;

extracting landmark points corresponding to a vicinity of the moving object from the landmark database according to the localization information;

generating a ground truth image by projecting the local coordinates of the landmark points into an image domain; and generate training data by refining the generated ground truth image, the refining comprising searching the ground truth image for target landmark points corresponding to the identified one or more landmark points.

13. The method of claim 12, wherein the geographic coordinates comprises geographic coordinate system coordinates or projected coordinate system coordinates of the landmarks.

14. The method of claim 12, wherein the extracting of the landmark coordinate comprises:

determining a region of interest (ROI) based on an image of surroundings of the moving object; and extracting the landmark points based on their being in the ROI.

15. The method of claim 12, wherein the searching the ground truth image for target landmark points corresponding to the identified one or more landmark points obtains pixel coordinates of the landmark points based on the ground truth image.

16. The method of claim 12, wherein the searching the ground truth image for target landmark points corresponding to the identified one or more landmark points is performed in a local patch image of the ground truth image.

17. The method of claim 16, the training data is generated by generating a map based on global coordinates of the target landmark points.

18. The method of claim 12, wherein the localization information comprises geographic coordinates of the moving object.

* * * * *